United States Patent [19]

Arno

[11] 4,101,085
[45] Jul. 18, 1978

[54] RADIALLY EXPANSIBLE COLLET FOR A TUBULAR SLEEVE

[75] Inventor: David Michael Arno, Toledo, Ohio

[73] Assignee: Johns-Manville Corporation, Denver, Colo.

[21] Appl. No.: 700,103

[22] Filed: Jun. 28, 1976

[51] Int. Cl.² ............... B65H 54/74; B65H 75/30; B65H 79/00
[52] U.S. Cl. ............... 242/18 G; 242/46.4; 242/46.6; 242/72 B
[58] Field of Search ............... 242/18 G, 46.2, 46.3, 242/46.4, 46.5, 46.6, 72 R, 72 B

[56] References Cited

U.S. PATENT DOCUMENTS

| | | | |
|---|---|---|---|
| 2,537,492 | 1/1951 | Tidland | 242/72 B |
| 3,048,345 | 8/1962 | Willard | 242/72 B |
| 3,289,966 | 12/1966 | Richel | 242/72 B |
| 3,391,878 | 7/1968 | Naccara | 242/72 B |
| 3,871,592 | 3/1975 | Kallenborn | 242/18 G |
| 3,908,926 | 9/1975 | Ochs et al. | 242/72 B |
| 3,945,583 | 3/1976 | Ochs et al. | 242/72 B X |

FOREIGN PATENT DOCUMENTS

843,668 8/1960 United Kingdom ............ 242/18 G

*Primary Examiner*—Stanley N. Gilreath
*Attorney, Agent, or Firm*—Robert M. Krone; Joseph J. Kelly; Charles C. Corbin

[57] ABSTRACT

A radially expansible supporting collet for a tubular light-weight sleeve upon which a continuous filament, yarn, or roving may be wound. The collet comprises a plurality of axially extending, sleeve contacting bars carried on a generally cylindrical body which is rotated on its normal axis. At least one generally annular, closed, pneumatically expansible bladder is carried by and rotates with the body. The bladder is located inwardly of the bars and may be connected to a source of air under pressure. When the bladder is expanded by the air, it presses outwardly against the bars to move them radially outwardly against the interior of the sleeve in order to hold the sleeve concentric with the axis of the body, to prevent its axial movement and to transmit torque to the sleeve.

10 Claims, 11 Drawing Figures

RADIALLY EXPANSIBLE COLLET FOR A TUBULAR SLEEVE

BACKGROUND OF THE INVENTION

It is well known in the art of forming continuous glass fiber, filaments, strands and/or rovings, the latter comprising as many as hundreds of individual glass fibers gathered together and treated as a unit, to pull those glass fibers from the forming bushing by leading them around the exterior of a rotating tube to build up upon the tube a considerable mass of the fibers so that they later can be utilized for weaving, etc. As the length of strand or roving builds up upon the tube, the tension of pulling the hundreds of glass fibers from their forming bushing creates inwardly compressive force on the mass of fibers and thus upon the tube about which they are wrapped. This inward force is transferred, of course, to the surface of the device upon which the tube is mounted for rotation.

In order to form satisfactory "packages," i.e., masses of continuous groups of filaments such as strands or rovings on such a sleeve, it is essential that several criteria be observed.

First, it is necessary that the mechanism for mounting and rotating the package tube be able to receive and hold the tube and be so designed as to permit the removal of a loaded tube.

Second, it is essential that the tube upon which the strand or roving is being wound shall not move axially during the winding process because any such movement will disturb the "lay-up" on the tube and may result in over-wrapping turns on the tube which would create snarls and entanglements at the time of removal of the strand or roving from the tube for subsequent processing operations such as weaving and the like.

Third, it is critically essential that the tube and the body of strand being built up thereupon shall be maintained in true cylindrical configuration so that the lineal speed of pulling of the strand or roving and the hundreds of fibers of which it is comprised will be constant and will not have any "beat frequencies" which would result if, for example, one portion of the package tube on which it is being wound had a greater or lesser radius than some other portion.

Fourth, the desired fixed diameter of the package tube and the mass of strand or roving being built up thereupon must be uniform from one end of the tube to the other, i.e., even though the surface remains truly circular. If, for example, the diameter at the center of the length of the tube is greater than that at its ends, when the strand is led back and forth across the center portion the lineal speed of the strand will be increased and decreased, which also tends to interfere with the pulling operation.

It previously has been suggested that package tubes of this type may be mounted upon collets comprising expansible balloon-like bladders of the like which can be expanded radially outwardly by air under pressure to frictionally engage the inner surface of the tube to transmit torque to the tube, to endeavor to hold it against axial movements, and to hold it in its fully cylindrical shape. Unfortunately, if simple balloon-like bladders are utilized, the pressure along their axial length is not uniform; they may bulge to a lesser extent at various axially spaced portions of their circumference; they will not necessarily hold the entire axial length of the tube to the constant desired diameter.

It also has been suggested that such an expansible device might be designed having axially extending bars mounted on its periphery, which would be moved outwardly into contact with the inner surface of the sleeve by air pressure admitted to individual expansion chambers located radially inside of the bars. If each bar is provided with its own expansion chamber, it is then difficult to be certain that all of the bars are pressed outwardly with the same force and maintained out at their preferred diameters to satisfactorily contact and hold the package tube.

Examples of the foregoing devices are illustrated in the U.S. Pat. Nos. 3,458,150; 3,904,144; 3,414,210; 3,273,817; and others.

It also has been suggested that package tubes of the type herein discussed adequately may be held in place and maintained in true cylindrical configuration by the utilization of a mounting collet having radially movable support bars which are radially moved outwardly into contact with the inner surfaces of the packages and held against the packages by the centrifugal force created by the relatively high-speed rotation of the packages. In such devices, however, yet another problem may exist.

When the strand or roving first is led to the surface of the sleeve-like package, the circumference of the sleeve and its R.P.M. determine the lineal speed of pulling of the strand or roving and thus of the hundreds of individual glass fiber filaments of which it is comprised. As the body of strand or roving builds up upon the sleeve and upon itself, the effective diameter and, as a result, the lineal speed of the strands being wrapped will all increase. In order to maintain constant the diameters of the individual filaments being pulled from the forming bushing and thus satisfactory formation, as well as a constant weight per lineal dimension of the strand or roving, it has been learned that it is necessary gradually to decrease the R.P.M. of the package as it builds up. This may result in reducing the rotational speed of the package in a factor of as much as 2:1 between the beginning of the formation of an individual package and its completion. As a result, the package may be rotated at a speed as low, for example, as 400–500 R.P.M., which, of course, greatly reduces the centrifugal force acting to hold the package-contacting elements outwardly.

To overcome this problem, it would be necesssary greatly to increase the mass of the package-contacting elements so that at slower rotational speeds they would still adequately maintain contact with the interior surface of the package being wound. A considerable increase in the mass of these elements, of course, greatly increases the weight of the unit and may introduce excessive centrifugal force against the inner wall of the package during the initial portion of its rotation at a higher rotational speed. The determination, thus, of the mass of the package-contacting elements becomes important as well as the provision of some means for positively limiting the radially outward distance to which the package-contacting elements can be moved regardless of the rotational speed of the collet.

In general, devices suitable for the purposes discussed above are called "expansible collets" and will be so denominated herein.

It is, therefore, the principal object of the instant invention to provide a collapsible collet for a tubular sleeve onto which a very substantial length of a continuous filament, strand, or roving, or the like, is to be wrapped, the collet comprising a plurality of axially extending movable elements which are thrust outwardly into tight contact with the inner surface of the sleeve for delivery of rotary torque thereto and in order to hold the sleeve in cylindrical shape.

It is yet another object of the instant invention to provide an expansible collet for a tubular sleeve which will enhance the tubular sleeve with sufficient force to restrain it against axial movement, to apply rotational torque thereto, to maintain it in true cylindrical shape during substantial changes in its revolutions per minute as necessary to compensate for the increase in the diameter of the package being would thereon thus to maintain a constant lineal speed of the material being packaged.

It is yet another object of the instant invention to provide a collapsible collet having positive mechanical means for the engagement of the inner surface of the tubular sleeve mounted thereon, the mechanical means being pneumatically moved from an inner, reduced diameter position to a larger diameter position and held in such larger diameter position with sufficient force to maintain a firm grip of the tubular sleeve regardless of is revolutions per minute, while maintaining the sleeve in true cylindrical configuration.

DESCRIPTION OF PREFERRED EMBODIMENTS

Two embodiments of the instant invention are illustrated in the drawings and will be described in detail in the following specification. The first of these embodiments comprises two radially expandable pneumatic bladders which act against the opposite ends of axially extendng sleeve-contacting bars and the second of these modifications embodies a single radially expandable pneumatic bladder acting only on one end of each of the bars. Both of the modifications are shown as being constructed on the rotary, hollow, generally cylindrical housing of an electric motor, the shaft of which is mounted and held in stationary position so that the housing rotates relative to the shaft.

Figure 1:
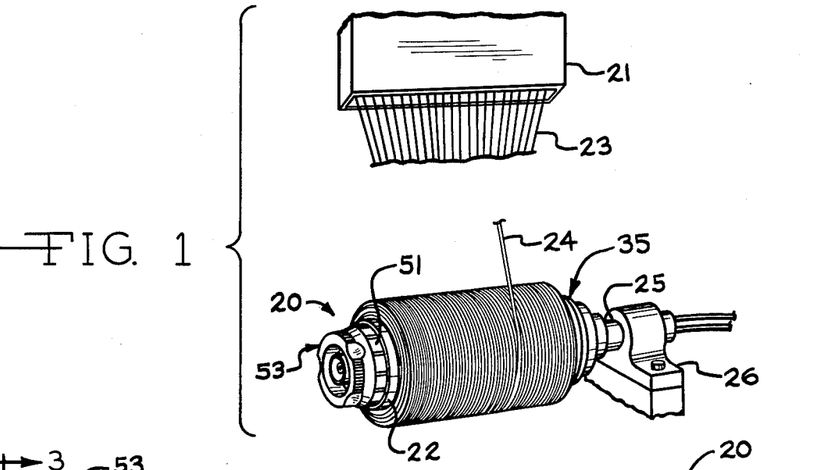
FIG. 1 is a fragmentary exploded view showing a collet embodying the invention in use for attenuating and packaging a continuous multi-filament glass strand or roving.
Figure 2:
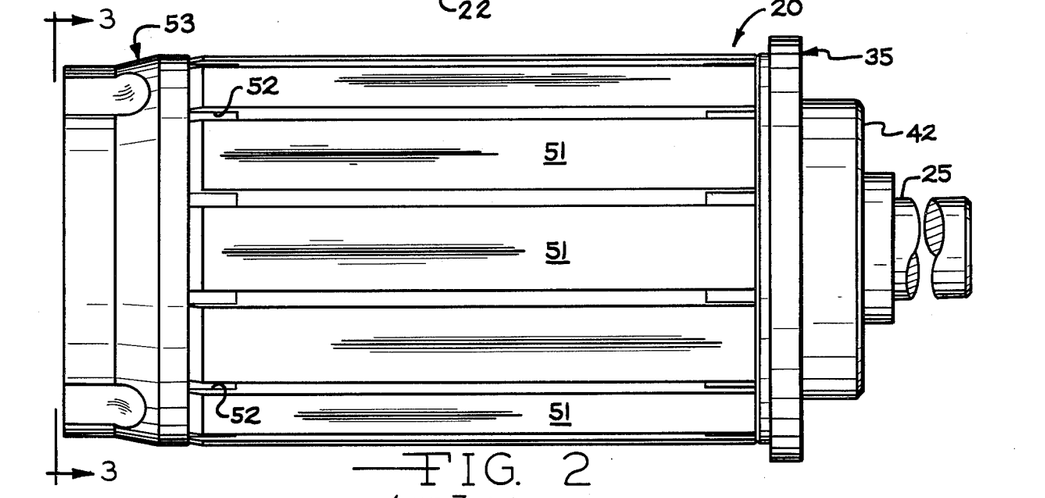
FIG. 2 is a side view in elevation of a collet embodying the invention, shown on an enlarged scale.
Figure 3:
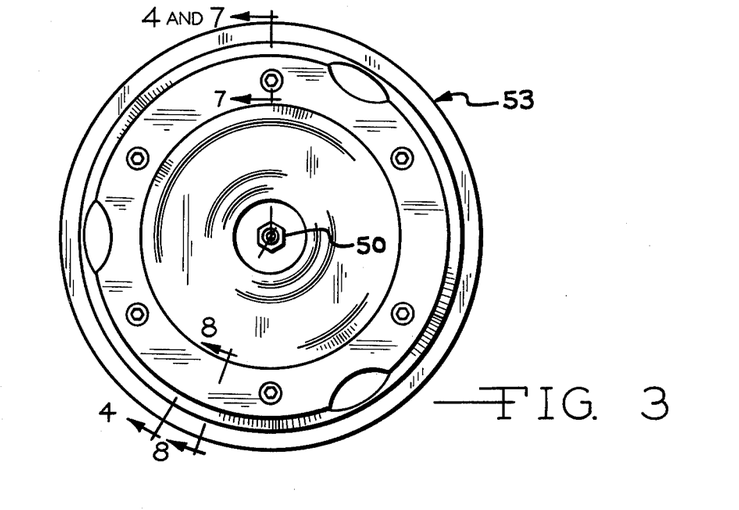
FIG. 3 is an end view taken from the position indicated by the line 3—3 of FIG. 2.

FIG. 1 is a view in perspective on a small scale showing how an expansible collet 20 according to the invention is mounted beneath a multiple tip bushing 21 to carry a light-weight cylindrical sleeve-like package 22. Individual glass fibers, numbering oftentimes in the hundreds and generally indicated by the reference number 23, are attenuated from the minute glass streams flowing from the tips of the bushing 21 and guided together, in this illustrative operation, to form a multiple fiber strand or roving 24. The roving 24 is led around the exterior of the sleeve-like package 22 and a motor, which has a shaft 25 that is clamped in a suitable structure indicated by the reference number 26, is energized to rotate the collet 20 on its axis. While not shown in FIG. 1, conventional lubricating, cooling and transversing mechanisms also would be provided in the fashion well-known in the glass fiber forming art.

The collet 20 comprises a hollow tubular housing 27 which is mounted concentrically with the shaft 25 and constitutes the rotary element of the electric motor which also includes a motor stator 28 mounted on the shaft 25. When the motor comprising the stator 28 and the housing 27 is energized, the housing 27 is rotated and thus the collet 20 is rotated at the speed determined by the motor controls.

The housing 27 has a plurality of longitudinally extending and circumferentially spaced, parallel ribs 29 on its periphery. Each of the ribs 29 is "T"-shaped in cross-section. Outermost surfaces 30 of the ribs 29 define a cylinder generated around the centerline of the motor shaft 25. All of the ribs 29 are cut back at each end of the housing 27 to provide a series of lands (see FIG. 7) for the reception of an outboard bladder 32 or an inboard bladder 33, respectively. The ribs 29 are milled away to form the lands 31 and flat ends 34, all of which lie in a radial plane at each end of the ribs 29.

Figure 4:
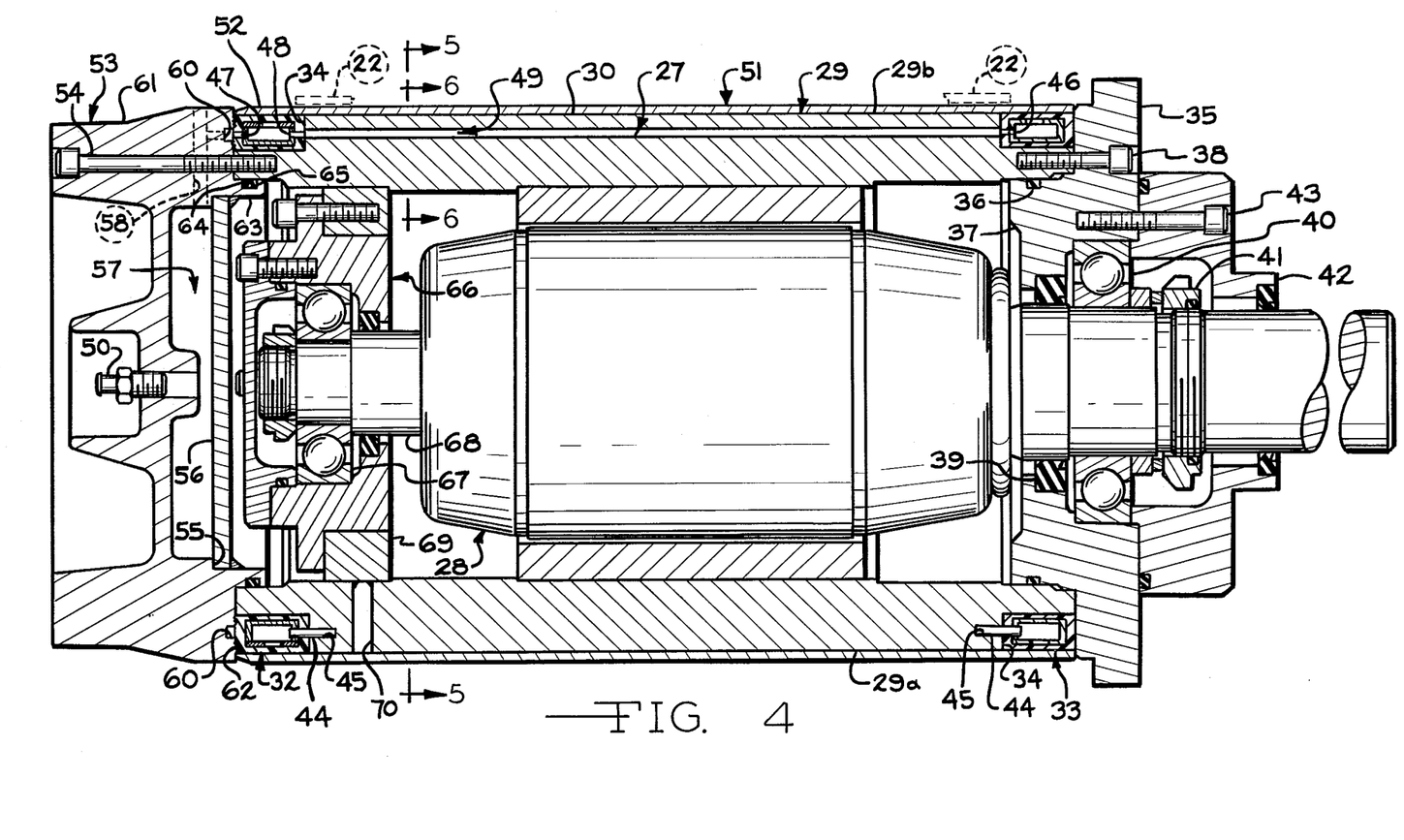
FIG. 4 is a sectional view taken along the line 4—4 of FIG. 3 and shown on a further enlarged scale.
Figure 5:
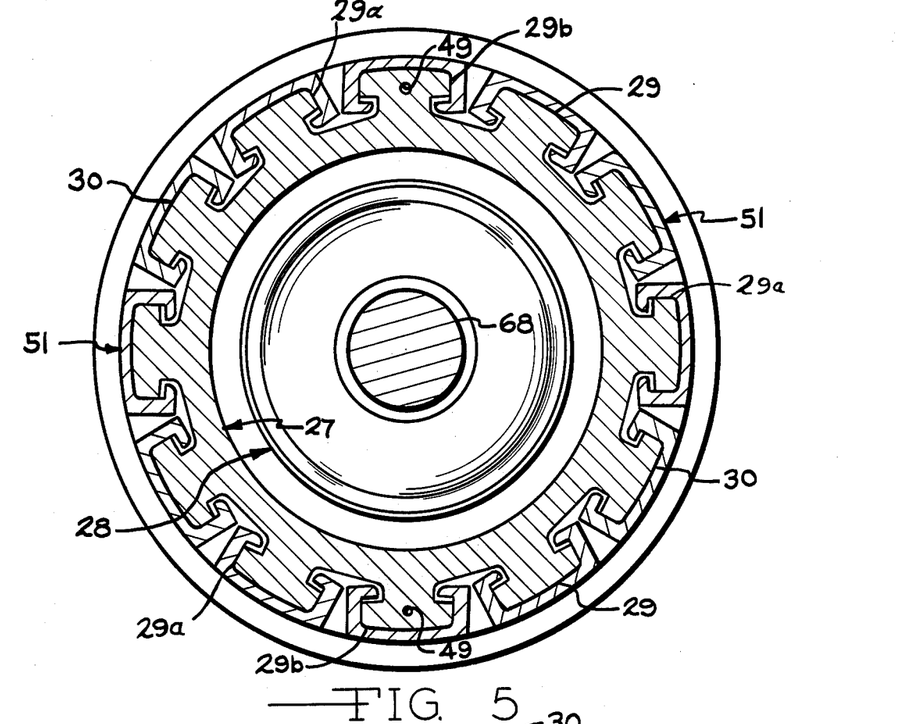
FIG. 5 is a vertical sectional view taken along the line 5—5 of FIG. 4.

The collet housing 27 is assembled on the motor shaft 25 by first sliding the inboard bladder 33, which is annular in shape, over the inner end of the housing 27 and up against the rib ends 34. An inboard cap 35 is then slid over the shaft 25 and up against the end of the housing 27, an O-ring 36 being fitted over an inner collar 37 on the end cap 35 which enters the open end of the housing 27. The end cap 35 is secured to the inner end of the housing 27 by a number of cap screws 38. A suitable inner grease seal 39, bearing 40, bearing lock nut 41 and mounting hub 42 are sequentially slid over the end of the shaft 25 and secured in place by tightening the lock nut 41 and connecting the hub 42 to the outer face of the cap 35 by several cap screws 43.

Each of the bladders 32 and 33 has several axially protruding locating pins 44 and each of a similarly spaced and corresponding number of the ribs 29, those specifically indicated by the reference number 29a, has a locating hole 45 drilled in its respective end surface 34. The purpose of the locating pins 44 and locating holes 45 is to position properly the respective one of the bladders 32 or 33 so that its air inlet passages 46 (bladder 33) or air inlet and outlet passages 47 and 48, respectively, (bladder 32) are aligned with communicating air passages 49 in two opposed ones of the ribs 29 which are specifically designated by the reference numbers 29b. As will later be explained, air under pressure is fed into the outboard end of the collet 20 by means of an air line which is connectable to an axially located air valve 50 so as to be fed through the air passages just mentioned (47-48-49-46) to apply air under pressure to the interior of both of the bladders 32 and 33.

With the collet housing 27 mounted on the motor shaft 25, as just explained, the next step consists in assembling on the exterior of the housing 27 a number of sleeve contacting elements 51 sometimes called "flight bars." Each of the flight bars is substantially C-shaped in the cross-section and can be slid onto its respective T-shaped rib 29 or 29a from the outer end of the housing 27. The arms of the C-shaped flight bars 51 are cut away at each end of the bars 51 so that each bar has only an axially extending tenon 52 at each end, the tenons 52 overlying the respective one of the bladders 32 or 33. As can best be seen by reference to FIG. 6 while the C-shaped flight bars 51 embrace the cross-bars of the T-shaped ribs 29 in each case, they do not tightly fit the cross-bars so that the flight bars 51 can move radially outwardly to engage the inner side of the wall of the sleeve-like package 22 when the bladders 32 and 33 are pressurized and can move inwardly when the bladders 32 and 33 are vented.

The outboard bladder 32 is then moved into position circumjacent the end of the housing 27 and inwardly of the tenons 52 on the outboard ends of the housing ribs 29. As in the case of the inboard bladder 33, the outboard bladder 32 has locating pins 44 which are inserted into locating holes 45 in the ends of the respective ribs 29 indicated by the reference number 29a in order to align the air outlet passages 48 of the bladder 32 with the outboard ends of the air passages 49 in the ribs 29b.

After the outboard bladder 32 has thus been slid over the lands 31 at the outboard ends of the ribs 29, a relatively heavy, cast outer end cap 53 is mounted on the outer end of the housing 27 and secured in place by cap screws 54 which extend through the wall of the end cap 53 and into suitable tapped holes in the outboard end of the housing.

The end cap 53 has a center bore for the air valve 50. When viewed from its inner side, the end cap 53 is cup-shaped and has an annular ledge 53 against which there is positioned a disc 56, the disc 56 being welded into place to define the inner side of a pressurized chamber generally indicated by the reference number 57. The valve 50 communicates with the chamber 57.

Figure 8:
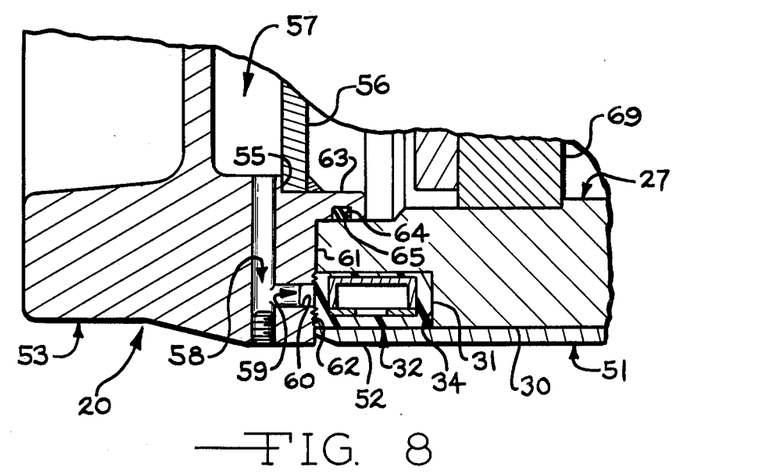
FIG. 8 is a fragmentary sectional view taken along the line 8—8 of FIG. 3 and shown on an enlarged scale.

Several radial air passages 58 (FIG. 8) extend outwardly from the chamber 57, intersecting axial bores 59 which, in turn, lead to an annular groove 60 in a radial flange 61 on the end cap 53. The surface of the flange 61 is formed with a plurality of circular, concentric knife-edge ribs 62. The end cap 53 also has an inwardly extending collar 63 (FIG. 4) which telescopingly enters the open end of the housing 27, the collar 63 having an annular groove 64 in which is located an O-ring 65 for sealing the end cap flange to the housing 27.

When the end cap 53 is inserted into the housing 27, the flange 61 and its knife-edge ribs 62 are tightly squeezed up against the outer side wall of the outboard bladder 32. As will later more fully be explained, the outboard bladder 32, as well as the inboard bladder 33, has outer walls made of compressible material so that the pressure of the knife-edge ribs 62 against the outer surface of the outboard bladder 32 causes the ribs 62 to "bite" into the surface of the bladder 32 providing an effective air seal on both the inner and outer sides of the groove 60, which thus is closed at its inner side by the wall of the bladder 32.

An outboard bearing assembly generally indicated by the reference number 66 comprises a bearing 67 on a shaft 68 of the motor stator 28 and a mounting ring 69 supporting the outboard end of the collet housing 27. The ring 69 is secured in the housing 27 by spot welds such as that shown at the base of an access opening 70 in FIG. 4. Of course, the mounting ring 69 is positioned interiorly of the housing 27 prior to the assembly of the collet parts thereon.

Figure 7:
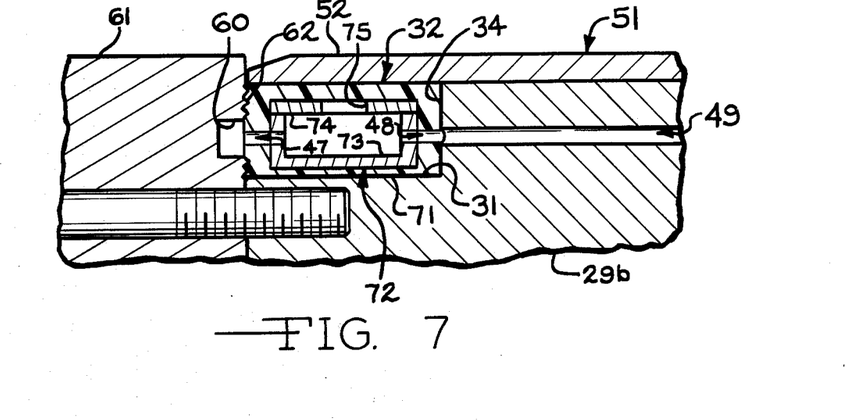
FIG. 7 is a fragmentary, vertical sectional view taken along the line 7—7 of FIG. 3 and shown on an enlarged scale.

As best can be seen by reference to FIG. 7, each of the outboard and inboard bladders 32 or 33, respectively, has an exterior jacket 71 and an interior reinforcement 72. The reinforcement 72 is illustrated as being fabricated from two pieces of metal 73 and 74, the first being U-shaped in cross-section with its arms extending outwardly and the second being a flat ring 74 which is welded or otherwise secured tightly at the outer edges of the arms of the U-shaped part 73. A series of aperatures 75 is drilled or punched through the ring 74 along its median circumference.

The jackets 71 of the bladders 32 and 33 are illustrated as being molded from relatively tough but elastic synthetic resinous material, for example polyurethane, physically being air-tight with the exceptions, of course, of the inlet and outlet air passages 47 and 48 of the bladder 32 and the inlet air passages 46 of the bladder 33.

After complete assembly of the collet 20 on its shaft 25, it then is mounted as illustrated in FIG. 1 beneath a fiber-forming bushing 21 and electrically connected to the source of power by which it is to be rotated. A sleeve-like package 22 is slid onto the collet 20. No problem is encountered in sliding the package 22 over the collet 20 because, at this point, the bladders 32 and 33 are not subjected to air pressure, and the flight bars 51 readily can be moved inwardly on their respective ribs 29. Air under pressure greater than atmospheric is then fed into the interior of the collet 20 through its valve 50 building up sufficient pressure in the chamber 57, the groove 60, and through the various connecting air passages 47, 48, 49, and 46 to the interiors of the two bladders 32 and 33.

Figure 6:
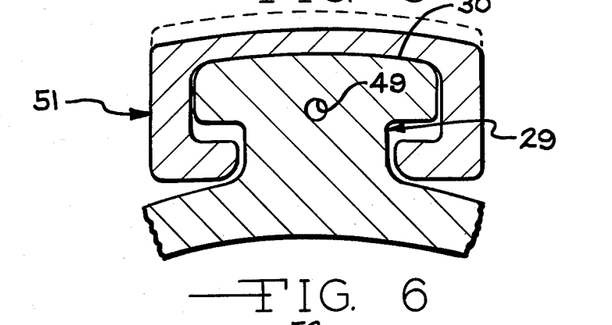
FIG. 6 is a fragmentary, vertical sectional detail view taken along the line 6—6 of FIG. 4 and shown on a further enlarged scale.

The air acts against the outer walls of the bladders 32 and 33 through the apertures 75 expanding the outer walls into contact with the tenons 52 of the flight bars 51 moving them radially outwardly, as shown in broken lines in FIG. 6. This increases the diameter of the cylinder defined by the outer surfaces of the flight bars 51 until they engage the inner surface of the package 22, giving to the package 22 a true cylindrical shape. The force with which the flight bars 51 engage the package 22 functions not only to hold the package 22 in cylindrical shape during the winding and pulling process but also to deliver to it adequate torque to effect the pulling of the hundreds of individual filaments and their collection into the strand or roving and to prevent the package 22 from slipping axially on the collet 20. In addition, because the flight bars 51 are held outwardly by the air acting through the bladders 32 and 33, even when the outer diameter of the package of roving or strand increases substantially and the revolutions per minute of the collet 20 are compensatorily reduced, thus reducing the centrifugal force acting on the flight bars 51, the package still is maintained properly on the collet 20.

Figure 9:
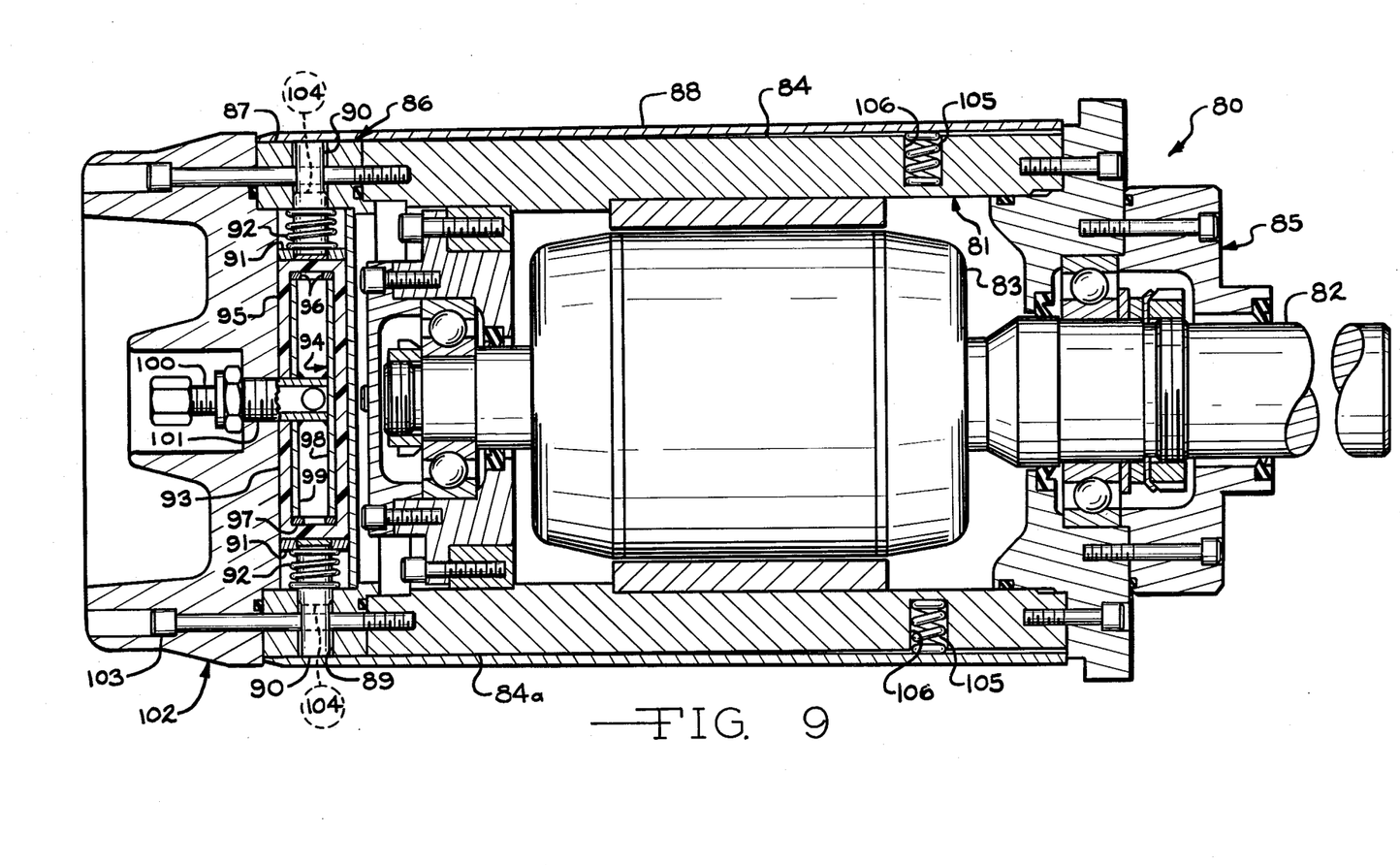
FIG. 9 is a vertical sectional view similar to FIG. 4 but showing a second embodiment of the invention.

A second embodiment of the invention is illustrated in FIG. 9. In this modification, a collet generally indicated by the reference number 80 comprises a tubular housing 81 which is mounted for rotation on a shaft 82, the shaft 82 carrying a motor stator 83 around which the housing 81 is rotated when the motor is energized.

As in the case of the embodiment earlier described, the housing 81 has a plurality of axially extending ribs 84, each of them having a T-shaped cross-section and being substantially identical with the ribs 29 of the earlier embodiment. The housing 81 is mounted for rotation on the shaft 82 by suitable bearings and seals (not shown) within an inner end cap generally indicated by the reference number 85.

In this embodiment, however, and in contrast to that earlier described, a housing extension ring 86 is adapted to be mounted on the outer end of the main housing 81. The extension ring 86 has a plurality of radially extending rib extensions 87, each of which has a cross-section identical with one of the ribs 84 on the housing 81 and is associated therewith to extend the length of the T-shaped cross-section.

As in the earlier embodiment, the collet 80 also comprises a plurality of longitudinally extending flight bars 88, each of which is C-shaped in cross section and is adapted to slide longitudinally over a respective one of the T-shaped ribs comprising the main ribs 84 and rib extensions 87. In this instance, however, the flight bars 88 have their C-shaped cross-section throughout their lengths and thus embrace not only the ribs 84 on the housing 81 but also the rib extensions 87 on the ring 86.

A radially extending guide bore 89 is drilled through the center line of each of the rib extensions 87 of the ring 86. Each of the bores is designed to accept and guide the end of an expander pin 90. Each of the pins 90 has a thrust pad 91 located at the inner end of the pin 90, and each of the pins extends through a small coil spring 92 located between the outer side of the respective pad 91 and the inner surface of the ring 86.

When the extension ring 86 is positioned at the end of the housing 81 and the rib extensions 87 are aligned with the main ribs 84, the flight bars 88 may then be slid onto the housing and the extension ring 86 inserted into the open ends of the flight bars 88.

A single bladder, generally indicated by the reference number 93, is employed in this embodiment of the invention. The bladder 93, while generally similar to the bladders 32 and 33 of the earlier embodiment of the invention in that it comprises both an inner reinforcement 94 and an outer molded jacket 95, is different in its internal construction. The inner reinforcement 94 is a hollow disc-like body having a plurality of apertures 96 in its outer cylindrical wall 97, an imperforate inner radial wall 98 and an outer disc-like wall 99 that is parallel to the inner wall 98. A pneumatic valve 100 is threaded onto a nipple 101 at the axial center of the outer wall 99 of the bladder 93.

Figure 10:
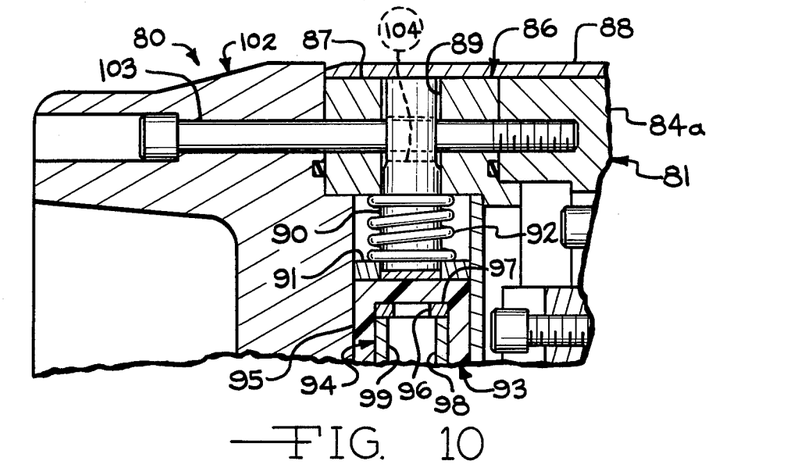
FIG. 10 is a fragmentary, vertical sectional view showing an upper left-hand portion of FIG. 9 on an enlarged scale.

After the bladder 93 has been inserted within the space defined by the pads 91 of the expander pins 90, a cup-shaped outer end cap 102 is positioned on the outer ends of the housing extension ring 86 and mounted thereon by cap screws 103 which extend through suitable holes in the cap 101 and through elongated slots 104 (FIG. 10) in those of the expander pins 90 which are located in the rib extensions 87 that are aligned with the cap screw holes in the end cap 102 and suitable tapped holes in the end of some of the ribs 84, for example, those specifically indicated by the reference number 84a.

Figure 11:
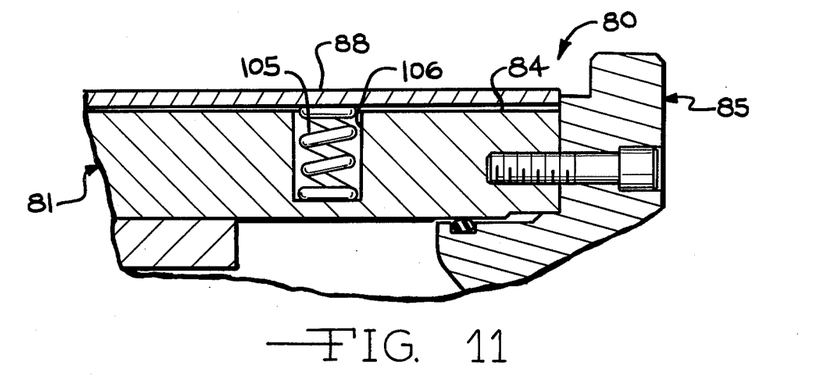
FIG. 11 is a fragmentary, vertical sectional view showing an upper right-hand portion of FIG. 9 on an enlarged scale.

Because this embodiment of the invention employs only one bladder 93 which expands radially when air under pressure is fed into its interior and thus thrusts the expander pins 90 radially outwardly to increase the diameter of the cylinder defined by the surfaces of the flight bars 88 at their outer ends only, means must be provided for holding the inner ends of the flight bars 84 at their maximum diameter. These means consist of a plurality of coil springs 105 which are positioned in pockets 106 in the T-shaped ribs 84 near their inner ends. The springs 105 bear against the inner surfaces of the flight bars 88 and hold them out as shown in FIG. 11.

When no air under pressure greater than atmospheric is present within the bladder 93, the coil springs 92 expand and push the expander pins 90 radially inwardly against the peripheral surface of the bladder 93. Thus, the outer ends of the flight bars 88 define a circle of less diameter than the diameter of the circle defined by the inner ends of the flight bars 88 or the diameter of the cylinder defined by the inner surface of the sleeve-like package 22. When it is desired to mount a package 22 on this collet 80, with the outer ends of the flight bars 88 at their lesser diameter, the flight bars 88 provide a frusto-conical surface over which a package 22 easily can be slid. Air is then applied to the valve 100 expanding the peripheral wall of the bladder 93 outwardly and pushing the expander pins 90 radially outwardly so that each of them lifts the end of its respective flight bar 88 until the flight bars 88 as a group contact the package 22 throughout its axial length. This holds the package sleeve in a true cylindrical form, delivers to it rotary torque for wrapping the strand or roving around its outer surface and prevents it from slipping axially on the collet 80. After a sufficient length of the strand or roving has been wrapped around the sleeve-like package 22, the motor is de-energized, air is bled from the interior of the bladder 93, allowing the outer ends of the flight bars 88 to move inwardly, and the package can be removed.

Having described my invention I claim:

1. A radially expansible supporting collet for a light-weight tubular sleeve, said collet comprising,
   (a) a tubular housing mounted for rotation,
   (b) a plurality of axially extending ribs on the exterior of said housing, each of said ribs having a cross-section of larger circumferential extent at its outer portion than at its inner portion,
   (c) axially elongated sleeve-contacting bars mounted on each of said ribs in rib-embracing relationship thereto for limited radial movement relative to the associated one of said ribs, and
   (d) a circular bladder at only one end of the housing for moving the corresponding ends of said bars radially outwardly for expanding the effective diameter of said collet for engagement of said bars with the inner surface of said sleeve and resilient means carried by said housing for biasing the other ends of said bars in their radially outward position.

2. A collet according to claim 1 in which the outer surface of the bladder directly contacts the radially movable bars.

3. A collet according to claim 1 in which the bladder is annular in shape.

4. A collet according to claim 1 in which the outer surface of the bladder engages a radially movable thrust pin for each of the radially movable bars and the pin engages the movable bar and in which said pins are biased radially inwardly.

5. An expansible collet for removably mounting and rotating a tubular sleeve-like, light-weight package for a continuous length of a filament, strand, roving, or the like; said collet comprising, (a) a generally cylindrical, hollow housing that is adapted to be rotationally mounted on a stationary motor shaft and motor stator, (b) a plurality of axially extending ribs on the exterior of said housing, each of said ribs having a T-shaped cross-section with the cross-bar of said rib being spaced radially outwardly from the surface of said housing, (c) an axially extending sleeve-contacting bar having a generally C-shaped cross-section mounted on each of said ribs in embracing relationship to the cross-bar of the associated one of said T-shaped ribs for limited radial movement relative to said rib, (d) a pneumatically expandable bladder carried by said housing for moving one of the ends of all of said bars radially outwardly when said bladder is expanded by air under pressure, said bladder comprising a hollow, circular reinforcement having an outer circumferential wall with apertures therein, rigid side walls and an air inlet, and a stiffly resilient jacket enclosing at least the side walls and outer circumferential wall of said reinforcement, and (e) radially outwardly effective means for effecting the positioning of the other ends of all of said bars in the radially outward position thereof.

6. A collet according to claim 5 in which the radially outwardly effective means is a second bladder communicating with the first bladder.

7. A collet according to claim 5 in which the outer circumferential surface of the jacket directly engages the sleeve-contacting bars.

8. A radially expansible supporting collet for a lightweight tubular sleeve, said collet comprising:

(a) a tubular housing mounted for rotation, (b) a plurality of axially extending ribs on the exterior of said housing, each of said ribs having a cross-section of larger circumferential extent at its outer portion than at its inner portion, (c) axially elongated sleeve-contacting bars mounted on each of said ribs in rib-embracing relationship thereto for limited radial movement relative to the associated one of said ribs, each of said bars having a cross-section of larger circumferential extent than the larger cross-sectional circumferential extent of said rib and being longer than said associated rib so as to provide an axially extending end portion at each end of the bar not embracing said rib, (d) the outer surfaces of said bars comprising a segment of a cylindrical surface, (e) means for applying a force to each said end portion of each said bar to move said bars radially outwardly into contact with said tubular sleeve and to maintain said tubular sleeve in a cylindrical shape, (f) said means for applying said force comprising a closed annular bladder mounted on and rotatable with said housing adjacent each end of said housing, each of said bladders having an outer wall facing radially inner parts of adjacent portions of all of said bars, and (g) air passageways connecting said bladders to the same source of air under pressure greater than atmospheric, whereby air under such pressure when admitted to said bladders expands the outer walls thereof radially and urges said bars into torque transmitting relationship with the inner surface of said sleeve.

9. A collet according to claim 8 wherein said bladder comprises:

(a) a hollow, circular reinforcement having an outer circumferential wall with apertures therein, rigid sidewalls and an air inlet, and a stiffly resilient jacket enclosing at least the sidewalls and outer circumferential wall of said reinforcement.

10. A collet according to claim 9 in which the bladder is annular in shape and includes a rigid inner circumferential reinforcement wall.

* * * * *